(12) United States Patent
Wolpert et al.

(10) Patent No.: US 8,192,124 B2
(45) Date of Patent: Jun. 5, 2012

(54) SELF-DRILLING SCREW

(75) Inventors: Frank Wolpert, Eschental (DE);
Juergen Wanner, Waldenburg (DE);
Andreas Wunderlich, Kupferzell (DE)

(73) Assignee: Adolf Wuerth GmbH & Co. KG,
Kuenzelsau (DE)

( * ) Notice: Subject to any disclaimer, the term of this patent is extended or adjusted under 35 U.S.C. 154(b) by 492 days.

(21) Appl. No.: 12/302,083

(22) PCT Filed: May 25, 2007

(86) PCT No.: PCT/EP2007/004658
§ 371 (c)(1),
(2), (4) Date: Nov. 24, 2008

(87) PCT Pub. No.: WO2007/137771
PCT Pub. Date: Dec. 6, 2007

(65) Prior Publication Data
US 2009/0142159 A1 Jun. 4, 2009

(30) Foreign Application Priority Data
May 29, 2006 (DE) .......................... 10 2006 026 176

(51) Int. Cl.
*F16B 25/10* (2006.01)
(52) U.S. Cl. .................. 411/387.1; 411/386; 411/387.5; 411/411
(58) Field of Classification Search .................. 411/386, 411/387.1–387.8, 393, 394, 411; 408/199, 408/216
See application file for complete search history.

(56) References Cited

U.S. PATENT DOCUMENTS

| 3,045,523 | A | | 7/1962 | Reed 2nd |
| 3,094,893 | A | * | 6/1963 | Lindstrom ................. 411/387.4 |
| 3,125,923 | A | * | 3/1964 | Hanneman ................. 411/386 |
| 3,204,516 | A | | 9/1965 | Wieber |
| 3,241,426 | A | | 3/1966 | Gutshall |
| 3,463,045 | A | * | 8/1969 | Prescott ................. 411/387.8 |
| 3,710,676 | A | * | 1/1973 | Ringland ................. 411/387.7 |
| 3,738,218 | A | | 6/1973 | Gutshall |
| 3,779,664 | A | | 12/1973 | Caley et al. |
| 4,311,423 | A | | 1/1982 | Hirabayashi |
| 5,046,905 | A | * | 9/1991 | Piacenti et al. ............ 411/387.2 |
| 5,074,729 | A | * | 12/1991 | Oba ............................ 411/387.8 |
| 5,149,234 | A | * | 9/1992 | Durfee, Jr. ................. 408/211 |
| 5,294,227 | A | * | 3/1994 | Forster et al. ............... 411/386 |
| 5,413,444 | A | | 5/1995 | Thomas et al. |
| 5,829,935 | A | | 11/1998 | Kendall |
| 5,897,280 | A | * | 4/1999 | Dicke ........................... 411/411 |
| 6,923,611 | B2 | * | 8/2005 | Kenny ........................ 411/411 |
| 2003/0143057 | A1 | * | 7/2003 | Shinjo ....................... 411/387.1 |
| 2003/0143058 | A1 | * | 7/2003 | Takahashi et al. ......... 411/387.4 |

FOREIGN PATENT DOCUMENTS

| CH | 50995 | | 1/1910 |
| CN | 1590784 | A | 3/2005 |
| DE | 43120 | A | 9/1887 |
| DE | 424322 | A | 1/1926 |
| GB | 1025390 | | 4/1966 |
| GB | 2127927 | A | 4/1984 |

* cited by examiner

*Primary Examiner* — Victor Batson
*Assistant Examiner* — Roberta Delisle
(74) *Attorney, Agent, or Firm* — Boyle Fredrickson, S.C.

(57) ABSTRACT

Disclosed is a screw for hard wood, comprising a screw tip (3) with two cutting edges (5) that extend approximately parallel to each other and perpendicular to the longitudinal axis of the screw. The cutting angle of the cutting edges amounts to about 90°. A centering tip (7) which slightly protrudes from the two cutting edges (5) is embodied in the extension of the longitudinal axis of the screw. Said centering tip (7) prevents the screw from deviating to the side at the beginning of the drilling process.

12 Claims, 2 Drawing Sheets

SELF-DRILLING SCREW

Figure 2:
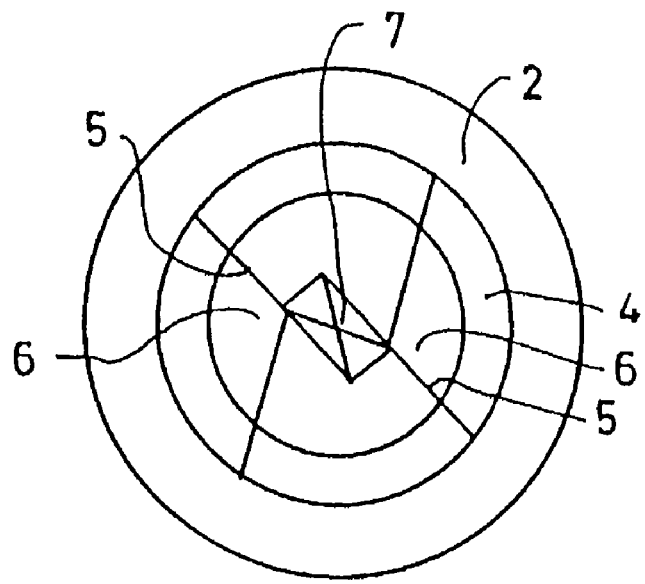

The invention relates to a self-drilling screw.

Screws that are intended to be screwed into wood, or similar materials, are frequently configured in the form of self-drilling screws in order that there will be no need to predrill screw holes for them. Screws having rolled tips, whereby their far ends will then have conical tapers, whose threads are rolled all the way out to the vicinities of their tips, are available for that purpose.

There are also self-drilling screws having cold-formed tips that are configured similarly to the tips of drill bits. Such screws thus have a pair of cold-formed cutting edges having an included angle of, for example, 118°.

Also known are wood screws that have a centring tip protruding beyond a scraping edge. However, such screws are intended for scraping, rather than drilling, purposes (cf. DE 50995).

In the case of very hard woods, such as those employed for constructing terraces, it has been found that those self-drilling screws that have thus far become available yield unsatisfactory results due to the hardness of the wood involved.

The invention is based on the problem of devising a self-drilling screw that will allow ready, rapid, penetration of, and may thus be readily and rapidly screwed into, even very hard wood.

In order to solve that problem, the invention proposes a self-drilling screw having those features stated under claim 1. Elaborations on the invention are covered by subsidiary claims.

The screw thus has a cutting tip having a pair of cutting edges that are essentially normal to the screw's longitudinal axis. In other words, the screw's tip angle is approximately 180°.

Since its cutting edges no longer form a truly pointed tip, under an elaboration on the invention, it may be provided that the screw's tip, i.e., its far end, has a centring tip protruding beyond its cutting edges. That centring tip is intended to prevent lateral wandering of the screw when drilling is initiated.

Under an elaboration on the invention, it may be provided that the two cutting edges are parallel to one another, as viewed from the screw's tip.

In particular, it may be provided that the two cutting edges are arranged offset from one another, as viewed from the screw's tip, and preferably offset in opposing directions from a diametric line passing through the centring tip.

However, both cutting edges might also lie on a line, as viewed from the screw's tip.

The centring tip might, for example, have either a conical shape or, in particular, a pyramidal shape, in which case, the edges of its pyramidal structure will play active roles in the drilling of holes.

In particular, it may be provided that the contour of the base of the pyramidal centring tip is a parallelogram, for example, a rhombus In elaborating on the invention, it may be provided that the cutting edges extend sides of the centring tip's base. However, the cutting edges might also extend edges of the pyramidal centring tip, as viewed from the screw's tip, and such is covered by the invention.

In particular, it may be provided that the recesses following the cutting edges extend over roughly two threads.

It may be provided that the screw's tip is cold-formed, rather than machined, and that the thread is subsequently rolled onto its, otherwise unthreaded, shaft, which will have already have been provided with a pointed tip and cutting edges.

Figure 1:
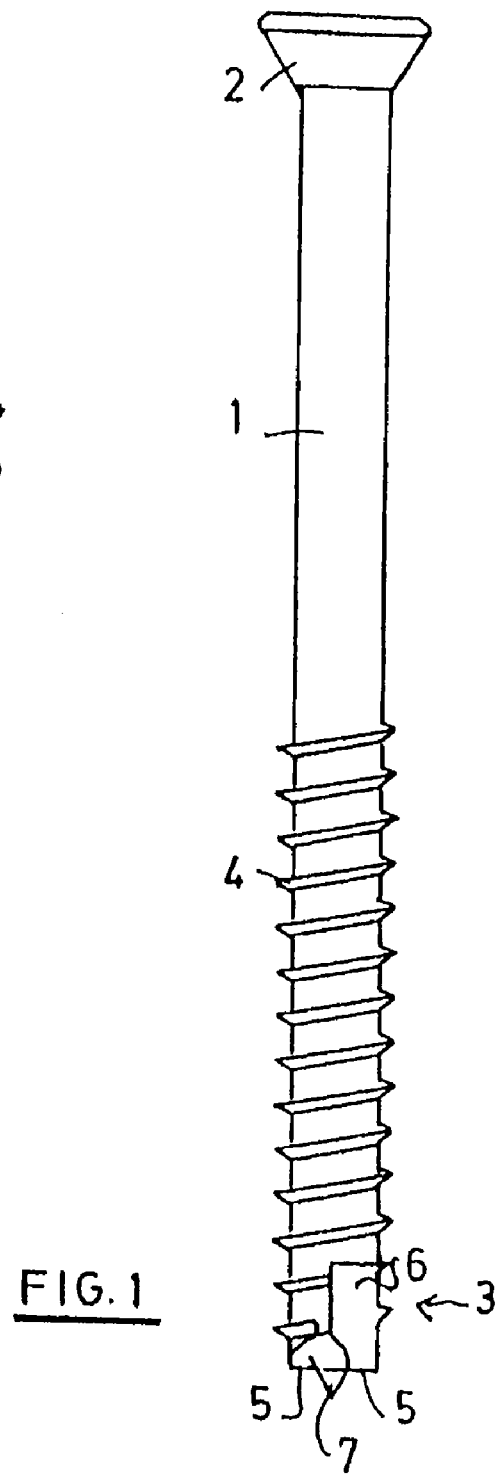
Figure 3:
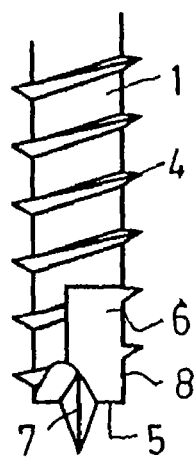
Figure 4:
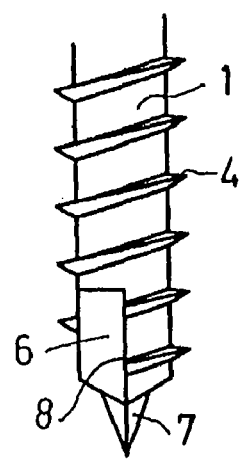
Figure 5:
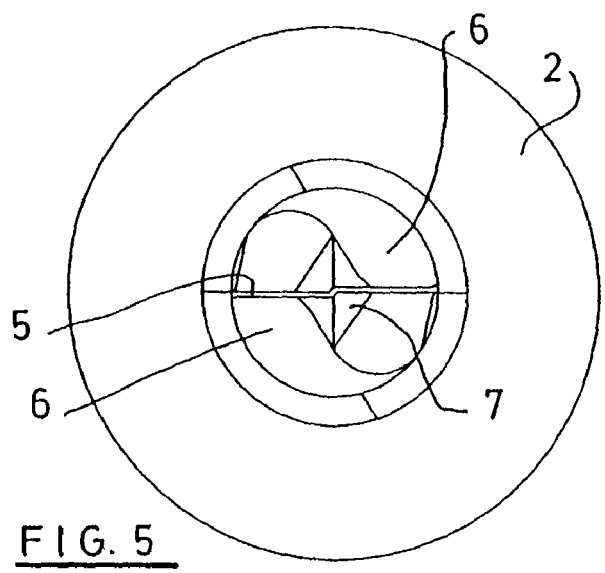
Figure 6:
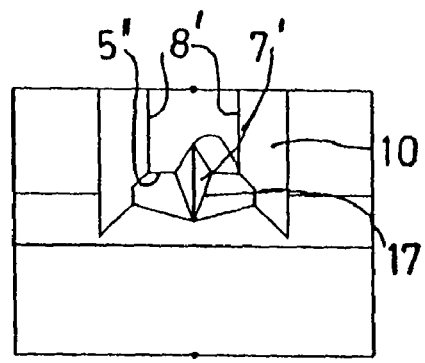
Figure 7:
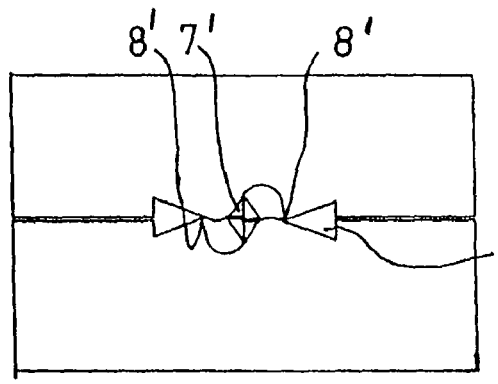

Other features, details, and benefits of the invention will be evident from the claims and abstract, whose wordings are herewith made an integral part of this description by way of reference thereto, the following descriptions of preferred embodiments of the invention, and the drawings, which depict:

FIG. 1: a side view of a screw according to the invention;

FIG. 2: an end-on view of that screw's tip, drawn on a larger scale;

FIG. 3: a side view of the tip of a modified embodiment of such a screw;

FIG. 4: another side view thereof, where the screw has been rotated through 90°;

FIG. 5: an end-on view of the tip of the screw shown in FIGS. 3 and 4;

FIG. 6: a top view of one half of a die for fabricating the screw's tip;

FIG. 7: an end-on view of the closed nipping die.

FIG. 1 depicts a side view of a screw having a cylindrical shaft 1. A head 2, in the case of the example shown, a flat head, is formed on the, in FIG. 1, upper, end of its shaft 1. Of course, other types of screw heads might also be formed thereon.

A tip 3 is formed on the far end of the screw's shaft, i.e., that end thereof opposite the screw's head. A thread 4 proceeding from the screw's tip extends over roughly half the length of the screw's shaft 1. That thread may be a symmetric, asymmetric, or double thread.

The flat on the far end of the screw's tip 3 has a pair of cutting edges 5 normal to the screw's longitudinal axis. In the side view depicted in FIG. 1, the two cutting edges 5 run along a normal to the screw's longitudinal axis. A recess 6 that extends over roughly two threads along the axial direction and whose lateral depth is roughly half the diameter of the screw's shaft is formed following, referred to the direction of the screw's advance, the, in FIG. 1, right-hand, cutting edge 5. The same also applies to the, in FIG. 1, left-hand cutting edge 5, where, in this case, the recess is on the far side of the screw's shaft and thus not shown in FIG. 1.

A centring tip 7 that centres the screw when it is set onto wood, or similar materials, and prevents the screw from wandering laterally during subsequent drilling operations is formed on the centre of that flat, preceding the pair of cutting edges 5.

Turn now to FIG. 2, which depicts an end-on view of the screw, drawn on a larger scale. The centring tip 7 has a pyramidal shape, whose base has a perimeter in the form of a parallelogram having two long sides and two short sides. In this end-on view, the cutting edges extend the longer sides of the base of the pyramidal centring tip 7. In this end-on view, the two cutting edges 5 are parallel to one another and each is offset the same distance from a centreline running between them and passing through the apex of the pyramidal centring tip 7.

Is has been found that such configurations of screw tips having a pair of mutually parallel cutting edges 5 allow more rapid drilling into very hard wood.

Turn now to the screw depicted in FIGS. 3 through 5, Unlike the preceding embodiment, the pyramidal screw tip 7 is now oriented differently. While, in the case of the embodiment shown in FIGS. 1 and 2, the offset cutting edges 5, which extend sides of the base of the screw's tip 7 in the end-on view, in the case of the embodiment shown in FIGS. 3 through 5, the cutting edges 5 extend edges of the pyramidal screw tip 7 in the end-on view. In the latter case as well, the contour of the base of the screw's tip is a parallelogram, and, in the case of the embodiment shown, a parallelogram whose four sides have equal lengths, i.e., a rhombus. The rhombus is oriented such that its longer diagonal is normal to the cutting edges 5, which provides that the length of the cutting edges, which commence at the base of the centring tip 7 and extend outward to the perimeter of the screw's shaft, will be greater, as may be particularly readily seen in FIG. 5, which depicts an end-on view of such a screw.

FIG. 7 depicts the end-on view of a closed nipping die for forming the screw's tip, where both the centring tip 7 and the recesses following the cutting edges 5 are coformed during formation of the screw's tip. FIG. 6 depicts a top view of one half of such a nipping die, where its internal contours matching the shape of the screw's tip, particularly those contours for forming the screw's pyramidal tip 7, are particularly readily evident.

The pair of identically contoured, nipping dies are closed in order to form the screw's tip on its shaft, which, as yet, has no thread, which will deform the material of its shaft. Flash that will be taken up by cavities 10 in the nipping dies will form outward from what will subsequently become the cutting edges 5, 8. A linear edge 8' abuts against an opposing surface in the closed status of the nipping dies in order to form the lateral cutting edges 8. The same applies to the edges 5' for forming the transverse cutting edges 5.

Two edges on the nipping dies abut against associated locations 17 in order to form the contours of the pyramidal cutting tip 7.

Once the nipping dies have been opened, the circumferential flash that has formed around the far end of the screw's shaft is broken off, yielding the lateral cutting edges 8 on the screw's shaft and the cutting edges 5 on its tip.

The thread 4 is then rolled onto the screw's shaft 1, once its cutting tip has been formed.

The invention claimed is:

1. A self-drilling screw having a screw head, a screw shaft, a thread on the screw shaft and a screw tip, the screw tip comprising a pair of cutting edges running essentially normal to the screw's longitudinal axis when viewed along the screw from one side, and a centring tip protruding beyond the cutting edges, wherein the centring tip has a pyramidal shape comprising four faces defining four cutting edges of the centring tip, at least two of said cutting edges of the centring tip running into respective ones of the pair of cutting edges of the screw tip.

2. A screw according to claim 1, wherein the pair of cutting edges are parallel to one another, as viewed from the screw's tip.

3. A screw according to claim 1, wherein the two cutting edges are arranged offset from one another, as viewed from the screw's tip.

4. A screw according to claim 1, wherein both cutting edges lie on a line.

5. A screw according to claim 1, wherein a contour of a perimeter of a base of the centring tip is shaped as a parallelogram.

6. A screw according to claim 1, wherein a contour of a perimeter of a base of the centring tip is shaped as a rhombus.

7. A screw according to claim 6, wherein the cutting edges of the screw tip extend sides of the base of the pyramidal centring tip, as viewed from the screw tip.

8. A screw according to claim 1, wherein the cutting edges of the screw tip extend cutting edges of the pyramidal centring tip, as viewed from the screw tip.

9. A screw according to claim 1, wherein the recesses formed following, referred to the direction of the screw's advance, the cutting edges extend over roughly two threads.

10. A screw according to claim 1, wherein its tip is cold-formed, rather than machined.

11. A screw according to claim 1, wherein its thread is rolled onto the screw shaft after its tip has been formed.

12. The screw according to claim 1, wherein the pair of cutting edges of the screw tip run normal to the screw's longitudinal axis.

* * * * *